April 15, 1930.  H. L. KRAEFT  1,754,431
WHEEL CONSTRUCTION
Filed June 9, 1928
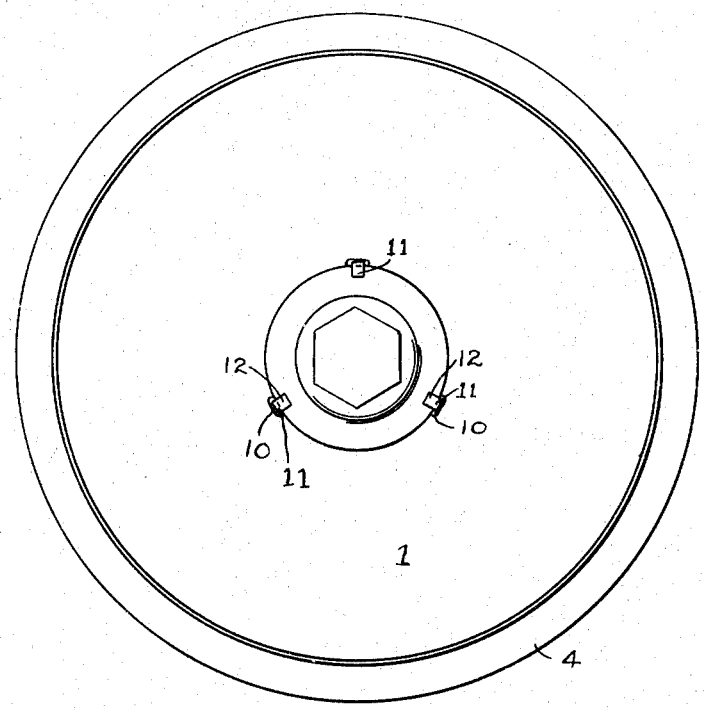
FIG.—1
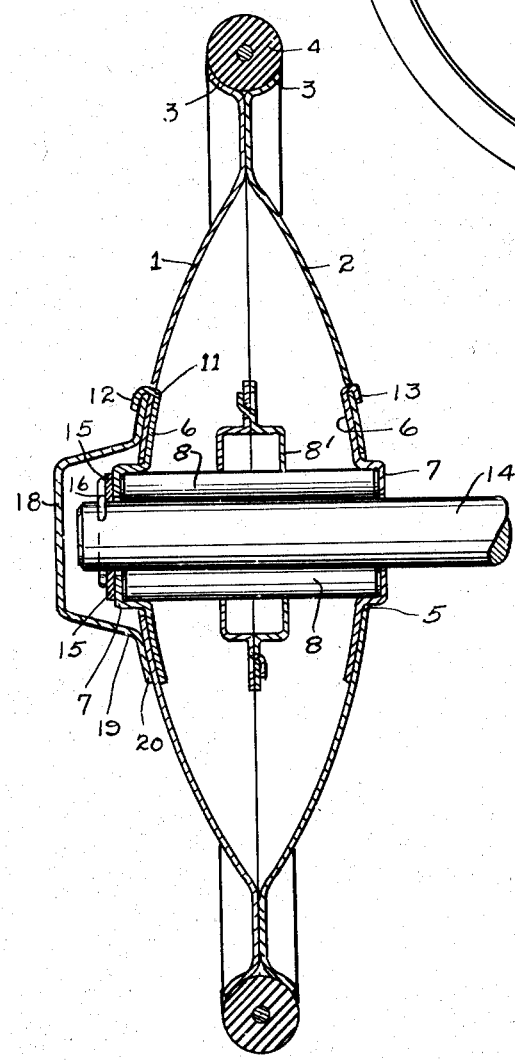
FIG.—2
Inventor
Herman L. Kraeft
By Bates, Macklin, Golrick & Tease
Attorney Patented Apr. 15, 1930

1,754,431

UNITED STATES PATENT OFFICE

HERMAN L. KRAEFT, OF CLEVELAND, OHIO, ASSIGNOR TO THE MURRAY OHIO MANUFACTURING COMPANY, OF CLEVELAND, OHIO, A CORPORATION OF OHIO

WHEEL CONSTRUCTION

Original application filed November 14, 1927, Serial No. 233,022. Divided and this application filed June 9, 1928. Serial No. 284,160.

The primary object of this invention is to provide an improved and simplified hub construction for a juvenile vehicle wheel.

A further object is to provide a hub construction, wherein the cap which conceals the end of the axle may be very simply formed and effectively held in place.

Further objects and features of the invention will become apparent from the following description relating to the accompanying drawing, wherein I show the preferred form. The essential characteristics will be summarized in the claims.

In the drawings, Fig. 1 is a side elevation of a wheel embodying the invention; Fig. 2 is a substantially central cross section through the wheel showing the hub cap construction.

Referring in detail to the drawing, 1 and 2 are discs forming the main body of the wheel, the discs having the central portion thereof spaced apart to provide a bearing support, and having their outer or rim portions brought together for rigid attachment as by spot welding. The discs may be flanged as at 3 to provide a support for a resilient tire 4.

The bearing construction includes a pair of plates 6 secured at the center of the hub, one plate for each disc. These plates are cupped at their central portions, as at 7, the cupped portions projecting outwardly in opposite directions through openings 5 in respective discs, and formed to receive the ends of rolling bearing elements 8. The bearings form a part of the subject matter of my copending application Serial No. 233,022, filed November 14th, 1927, of which the present application is a division.

Suitable means, such as a cage or retainer 8', more fully shown and described in my said application, may form a support for the rollers to hold them in position in the cupped portions 7 of the plates 6, when the wheel is off the axle.

Each of the discs 1 and 2 is shown as having a series of arcuately spaced slots at 10, and each of the plates 6 has lugs at 11, adapted to extend from the interior of the wheel outwardly through the slots, and to be bent over as at 12 and 13.

The axle 14 extends through central openings in the plates 6, and may be held in place, against axial movement in one direction, as by a washer 15 and cotter pin 16. In order to guard the free end of the axle, I provide a cup-shaped cap having a depressed central portion 18, and side wall 19 from which extends, outwardly, a continuous flange 20, the outer edge of which stops just short of the slots 10 of the disc 1. In Fig. 2 it will be seen that the lugs 12 directly engage the cap flange 20, thereby holding the cap in place on the disc, as well as securing the cupped plate 6 to the disc.

One advantage of the construction is that it does away with spot welding or riveting operations for holding the plates, such as 6, in place, and affords equal facility for placing the cap on either side of the wheel. It will be understood that the material for the cap may be fairly thin, while the material for the plates which hold the bearings should be much stronger and thicker, and therefore, the lugs will have a correspondingly greater strength then as though such lugs were formed on the cap to cooperate with openings in the discs. A further simplification of the advantage appears in that the cap may be made cheaper than when provided with the lugs.

I claim:

1. In a wheel including a disc body portion, an annular plate lying adjacent the disc and forming part of the hub structure and through which a portion of the axle is adapted to extend, projections extending outwardly from the plate, the disc having openings to receive the projections, and a hub cap overlying the central portion of the wheel, said projections being bent into engagement with the cap to hold the cap in place.

2. In a wheel construction of the type employing wheel-body forming separated discs, a hub construction comprising a pair of plates, one for each disc and disposed inwardly therefrom toward the center of the wheel, said plates being adapted and arranged to support an axle and bearings therefor, a plurality of lugs upstruck from one of the plates, openings in the adjacent discs to receive the lugs, and a hub cap arranged to conceal the end of such axle and having a flange extending close to the lugs, the lugs being bent inwardly toward the axis of the wheel over said flange to hold the cap in place.

In testimony whereof, I hereunto affix my signature.

HERMAN L. KRAEFT.